(12) United States Patent
Agarwal

(10) Patent No.: US 6,408,309 B1
(45) Date of Patent: Jun. 18, 2002

(54) METHOD AND SYSTEM FOR CREATING AN INTERACTIVE VIRTUAL COMMUNITY OF FAMOUS PEOPLE

(76) Inventor: Dinesh Agarwal, 5594 Blake House Ct., Burke, VA (US) 22015

( * ) Notice: Subject to any disclaimer, the term of this patent is extended or adjusted under 35 U.S.C. 154(b) by 0 days.

(21) Appl. No.: 09/511,069

(22) Filed: Feb. 23, 2000

(51) Int. Cl.[7] .............................. G06F 17/00; G06F 7/00
(52) U.S. Cl. .................................................. 707/104.1
(58) Field of Search ................... 707/1–10, 100–104.1, 707/500–541; 345/689, 700, 733–767, 520, 536–538, 1.1–2.1, 961–967

(56) References Cited

U.S. PATENT DOCUMENTS

| | | | | |
|---|---|---|---|---|
| 5,675,788 A | * | 10/1997 | Husick et al. ................. | 707/1 |
| 5,956,717 A | * | 9/1999 | Kraay et al. ................. | 379/188 |
| 6,340,978 B1 | * | 1/2002 | Mindrum .................... | 345/733 |

* cited by examiner

*Primary Examiner*—Jack Choules
*Assistant Examiner*—Linh Pham
(74) *Attorney, Agent, or Firm*—Dinesh Agarwal, P.C.

(57) ABSTRACT

A method and system for creating an interactive virtual community of famous people, or those people who wish to attain the status of a famous person, in a field of endeavor, such as arts, accounting, animal rights, business, education, engineering, entertainment, financing, government affairs, human rights, legal, medical, philanthropy, politics, religion, research, science, sports, etc. The virtual community of the present invention is unique in that the members of the virtual community can update, modify or revise their individual profile, and interact with other members of the virtual community, as well as the non-members of the virtual community.

20 Claims, 4 Drawing Sheets

METHOD AND SYSTEM FOR CREATING AN INTERACTIVE VIRTUAL COMMUNITY OF FAMOUS PEOPLE

FIELD AND HISTORICAL BACKGROUND OF THE INVENTION

The present invention is directed to creating biographical profile of people, and more particularly to a method and system for creating an interactive virtual community of famous people.

The depth of human curiosity is deep and enthusiasm for eagerness to learn about other beings in general, and human beings in particular, is high. While on one hand, psychologists and behavioral scientists continue to do more research to learn and understand human behavior, countless engineers and scientists continue to explore the outer world in an effort to identify the presence of life there and to understand other beings, if any.

In our quest to learn and understand others, we publish information about other people via various methods, including the print media and through radio and television and the most recent technological medium, the global network of computers, widely known as the "World Wide Web" or the "Internet".

While the present techniques offer several media to choose from to learn about the life experiences of another person, the information provided is not sufficient, and further does not present an opportunity for the people in the community to engage in an interactive dialogue with the person. In other words, although the biographical information about a person is presently available in various media, the information is mostly useful for research purposes. For example, a history student can research books, archived news media, or various online sources providing similar information, to learn, for example, about the life experiences of great leaders, such as Gandhi, Martin Luther King, Jr., John F. Kennedy. In the same manner, a student conducting research in the area of science, can research related books, print media, and/or online sources to learn more about scientists, etc.

The phenomena of publishing biographical narrations is generally not limited to publishing the account of a person's life experiences posthumously. In modern times, the experiences of a person are often reported via radio, print and television media. Many authors also publish books reciting the life experiences of another person. The conventional biographical accounts of a person are, however, limited in that the author typically does not return to the same person, either to update the earlier published account, or to present an interactive approach to the more recent life experiences of that person.

In particular, there presently is no method or system that allows a person either to update his/her biographical account or to communicate with another member from the community for interaction purposes. For instance, it would be extremely useful for the community to learn about a famous person's experiences since the earlier account. It would likewise be useful for that famous person to be able to modify, update, etc., his or her earlier version, as needed.

Another drawback of the conventional reporting or publication of the life experiences of a person is that presently they are rendered for only those people who have become famous or have attained a certain recognizable status in the community. While in the old days, generally only a limited number of people were able to attain the status of a famous person or a similar recognizable status in the community, in recent times the number of people who are becoming "famous", or are attaining a recognizable or known status in the community has grown by monumental proportions. This is particularly true in the area of telecommunications and information technology where the revolution of the World Wide Web or Internet has very quickly elevated many people to become famous or attain a very recognizable or known status in, for example, the business and financial world.

The explosion of the Internet technology has brought to the forefront, many technologically advanced and financially strong companies started by the younger generation. With the advent of this explosion, it would be very useful to have an interactive online or virtual community of the famous or well-known people which would allow other members of the community to learn from the experiences of the famous people, and to be able to interact with them for educational purposes or to satisfy their own curiosity. The system would further allow the famous people, as part of the virtual community, to update, modify or revise their biographical information in a "real time" manner, as needed.

OBJECTS AND SUMMARY OF THE INVENTION

The principal object of the present invention is to provide a method and system for creating an interactive virtual or online community of famous people.

An object of the present invention is to provide a method and system for creating an interactive virtual community of people who have attained a recognizable or well-known status in a community.

Yet another object of the present invention is to provide a method and system for creating an interactive virtual community of people from one or more fields of endeavors, such as arts, accounting, animal rights, business, education, engineering, entertainment, finance, government affairs, human rights, legal, medical, philanthropy, politics, religion, research, science, sports, etc.

Still yet another object of the present invention is to provide a method and system for creating a virtual community of selected members from a community which allows the members to interact with each other and with the non-members of the virtual community.

An additional object of the present invention is to provide a method and system for creating a virtual community of selected members from a community by creating individual biographical profiles of the selected members in a field of endeavor and making it available on the Internet.

Yet an additional object of the present invention is to provide a method and system for creating a virtual community of selected members from a community wherein the members have the capability of updating, revising or modifying their profile on as needed basis.

A further object of the present invention is to provide a method and system for creating an interactive virtual community of selected members from a community who wish to attain a selected status in a field of endeavor, such as arts, accounting, animal rights, business, education, engineering, entertainment, financing, government affairs, human rights, legal, medical, philanthropy, politics, religion, research, science, sports, etc.

A further object of the present invention is to provide a method and system for creating an interactive virtual profile of a person in a selected field of endeavor, such as arts, accounting, animal rights, business, education, engineering, entertainment, financing, government affairs, human rights, legal, medical, philanthropy, politics, religion, research, science, sports, etc.

Yet a further object of the present invention is to provide a method and system for creating an interactive profile of a person wherein the person can modify, revise or update his or her profile on as needed basis and from a remote location.

Still yet a further object of the present invention is to provide a method and system for creating an interactive virtual profile of a person wherein the person can interact with another person from the overall community.

Still yet a further object of the present invention is to provide a method and system for creating an interactive virtual profile of a person which allows the person to interact with another person whose profile is also online.

In summary, the main object of the present invention is to provide a method and system for creating an interactive virtual community of famous people, or those people who wish to attain the status of a famous person, in a field of endeavor, such as arts, accounting, animal rights, business, education, engineering, entertainment, financing, government affairs, human rights, legal, medical, philanthropy, politics, religion, research, science, sports, etc. The virtual community of the present invention is unique in that the members of the virtual community can update, modify or revise their individual profile, and interact with other members of the virtual community, as well as the non-members of the virtual community.

BRIEF DESCRIPTION OF THE DRAWINGS

The above and other objects, novel features and advantages of the present invention will become apparent from the following detailed description of the invention illustrated in the drawings, in which.

DETAILED DESCRIPTION OF THE INVENTION

Figure 1:
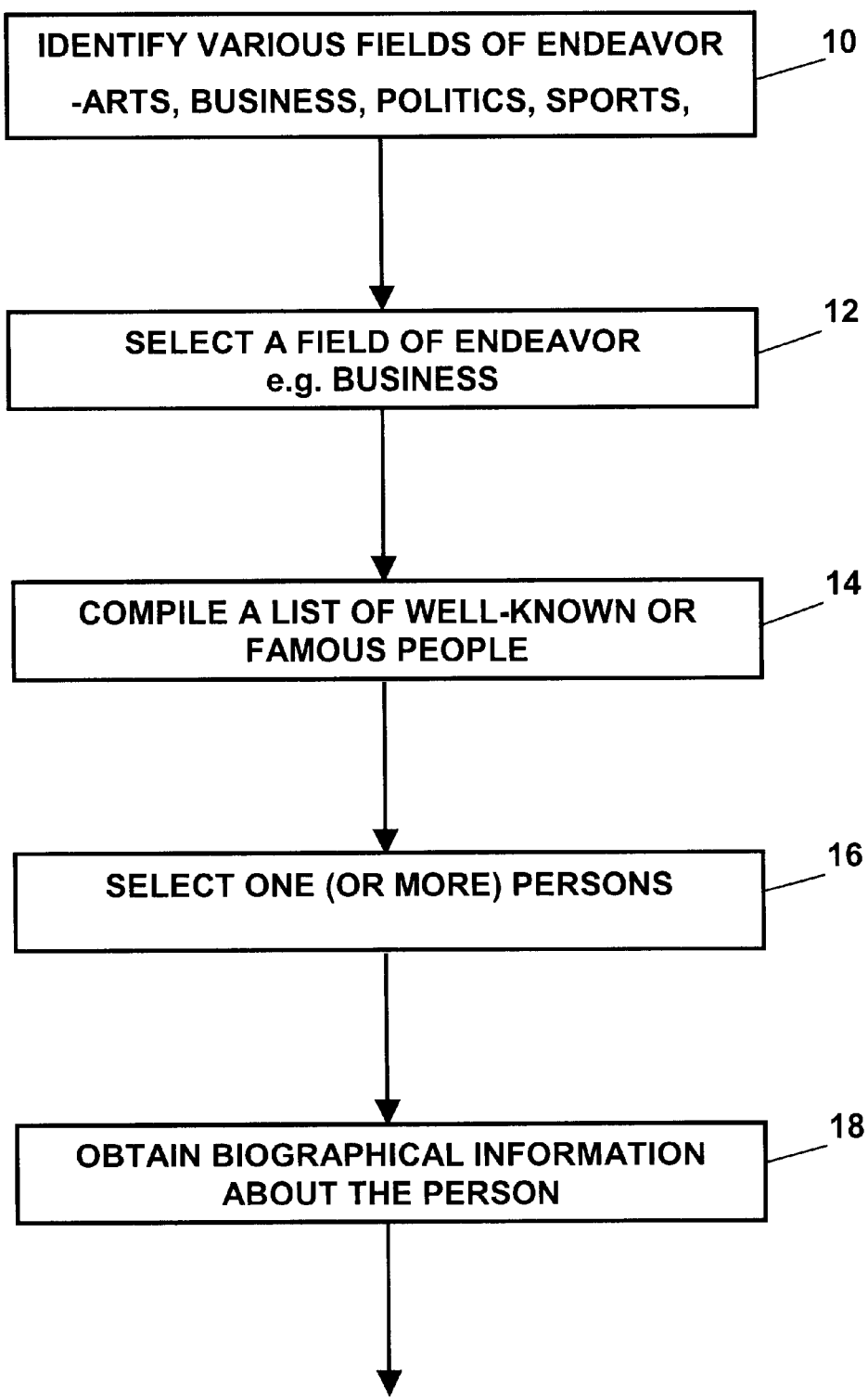
FIGS. 1–2 are a flow chart illustrating the method of the present invention.

Referring to FIG. 1, the method of the present invention is carried out by first identifying various fields of endeavor (10), such as arts, accounting, animal rights, business, education, engineering, entertainment, financing, government affairs, human rights, legal, medical, philanthropy, politics, religion, research, science, sports, etc. Once a particular field of endeavor has been selected (12), a list of people who are famous, well known, or have achieved a recognizable status in their field of endeavor is complied (14). A similar list of those people who wish to become famous or attain a certain recognizable status in the field of endeavor may be compiled.

Although various factors may be used to identify people who are famous (or wish to be famous), some of the criteria may include, number of years of experience in the chosen field of endeavor, nature of and number of prizes, private and/or governmental grant(s), financial networth, gross revenue of their business, official publications, general fame in the field of endeavor in particular, and name recognition in the society in general. The foregoing list of criteria for selecting people in a field of endeavor is provided as a general guide and various other factors or criteria may be used so long as people who have attained a certain, known status in the field are selected. The factors may be those recommended by other members in the same field, and/or those recommended by the members of the society in general. Once the list is completed, one or more members are selected (16) and then contacted to obtain their biographical information (18).

Although the type of information collected from the selected members would vary depending on the field of endeavor and the extent of profile desired, it would be useful to at least obtain the information relating to the selected member's experiences prior to and after attaining a certain known-status. In particular, the member's biographical profile will be created by the selected member's responses to the questions directed to the type of subject matter shown below in Tables 1–3.

TABLE 1

PERSONAL INFORMATION

Name
Address
Age
Place of Birth
Level of Education
Schools Attended
Overall Health
Family Information
Miscellaneous

TABLE 2

UNIQUE PERSONAL ATTRIBUTES a) Moments-
i) happiest, saddest, toughest, coolest, worst, best, weakest, successful, unsuccessful, embarrassing, and funniest;
b) Goal(s)-
i) past, present, or future;
ii) personal or professional;
c) Outlook for life-
i) past, present, or future;
ii) personal or professional;
d) Definition of Success-
i) past, present, or future;
ii) personal or professional;
e) Dreams-
i) past, present, or future;
ii) personal or professional;
f) Choices of food, items of personal possession, or places of vacation-
i) past, present, or future;
g) Interests-
i) past, present, or future;
ii) personal or professional;
h) Social activities-
i) past, present, or future;
ii) personal or professional;
i) Charitable activities-
i) past, present, or future;
ii) personal or professional;
j) Outlook for future, society, humanity, politics, government, religion, elderly, children, peers, animals, outer space, ocean, environment, or the selected field of endeavor.

TABLE 3

FIELD OF ENDEAVOR INFORMATION

Figure 4:
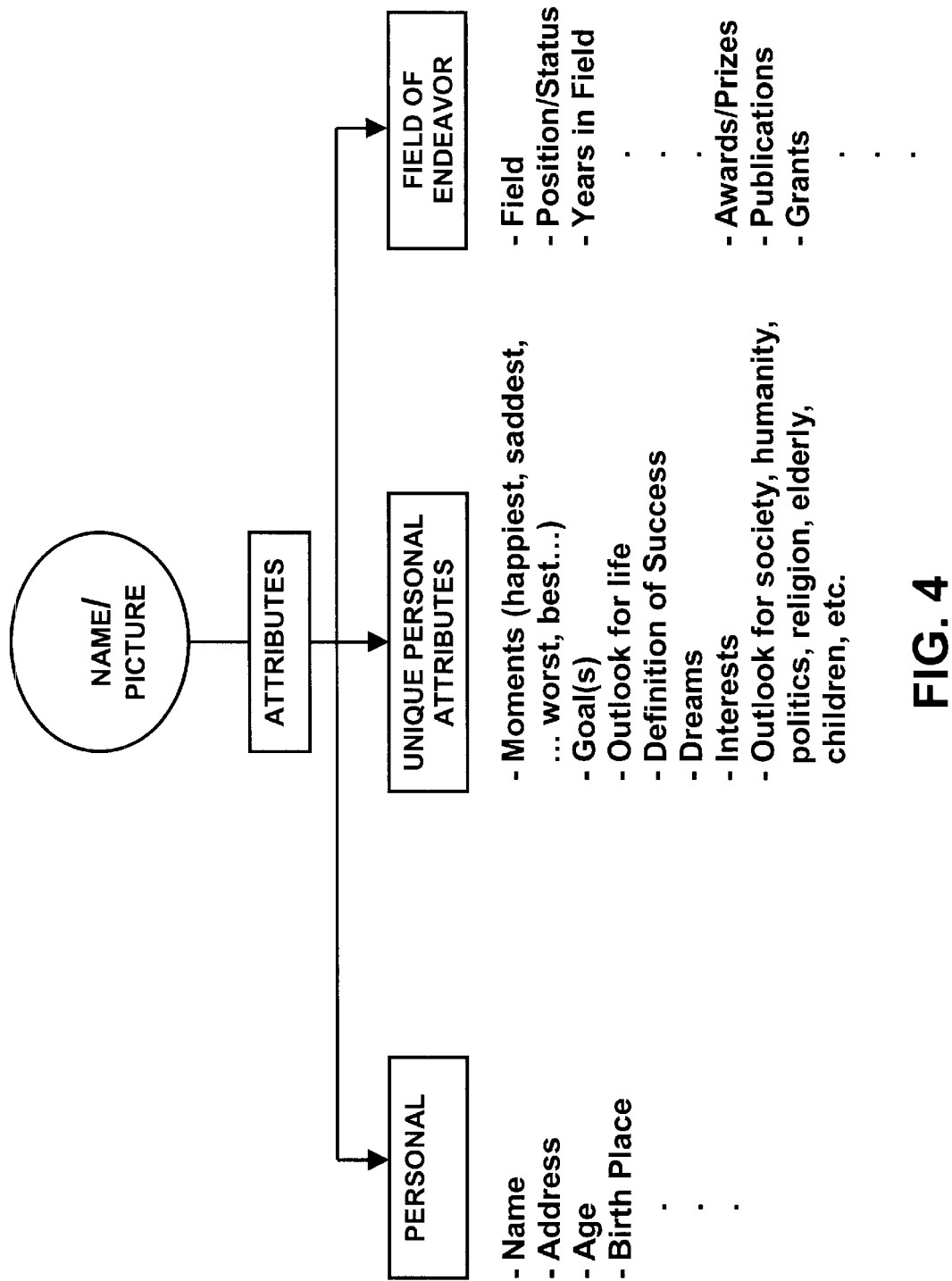
FIG. 4 is a schematic illustration of an on-line profile of a person.

Field
Position
Status
Years in Field
Awards/Prizes
Publications
Private/Government Grant(s)
Gross Receipts
Net Worth By processing the information from the selected member (20) and using an appropriate software, a profile of the member would then be created, in an illustration shown in FIG. 4. The profile would be made available in a machine readable media, such as diskette, compact-disk, etc., or stored in a personal computer of the member, or stored in a central remote location for access by the profiled member, other members of the virtual community, and the public general. For example, the profile so created may be made accessible via the Internet.

Figure 2:
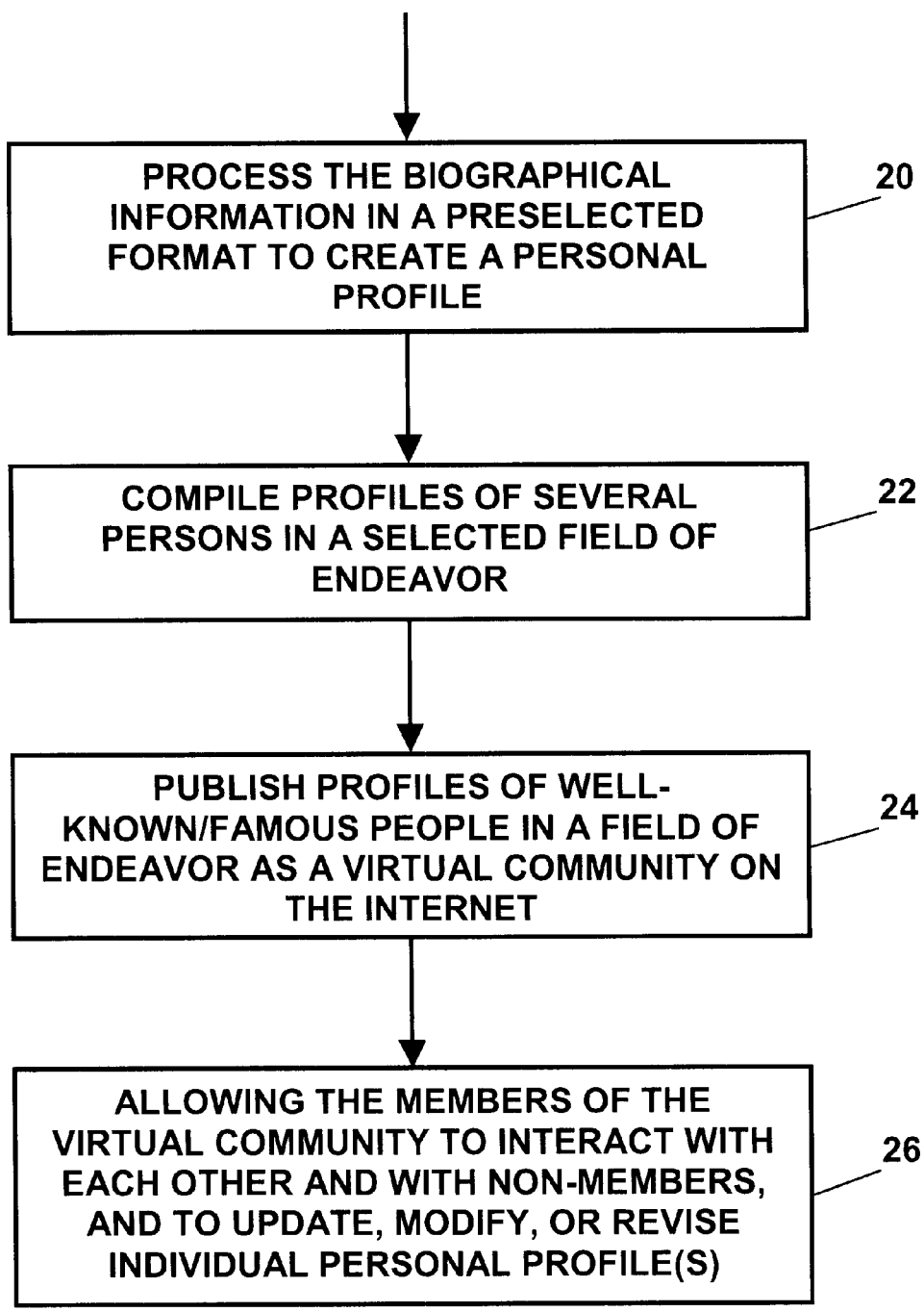

As shown in FIG. 2, by profiling several members in a field of endeavor (22), a virtual community of the famous people, or those people who wish to attain a certain status, may then be created (24). The underlying software or system would permit the members of the virtual community to interact with each other, as well as the members of the general public (26). The system would further have the capability to allow the members of the virtual community to periodically (or as desired) update, revise or modify their biographical information as they have new experiences, or if, for example, a significantly new type of information becomes relevant to their experiences (26). This would be particularly true of a member of a virtual community who wishes to attain a certain recognizable status in the society. For instance, a member upon receiving an award for contribution to his or her services in the chosen field of endeavor may wish to update his or her biographical profile and any associated experiences therewith, so that other members of the virtual community, as well as non-members of the community, may quickly gain access to the new information.

Figure 3:
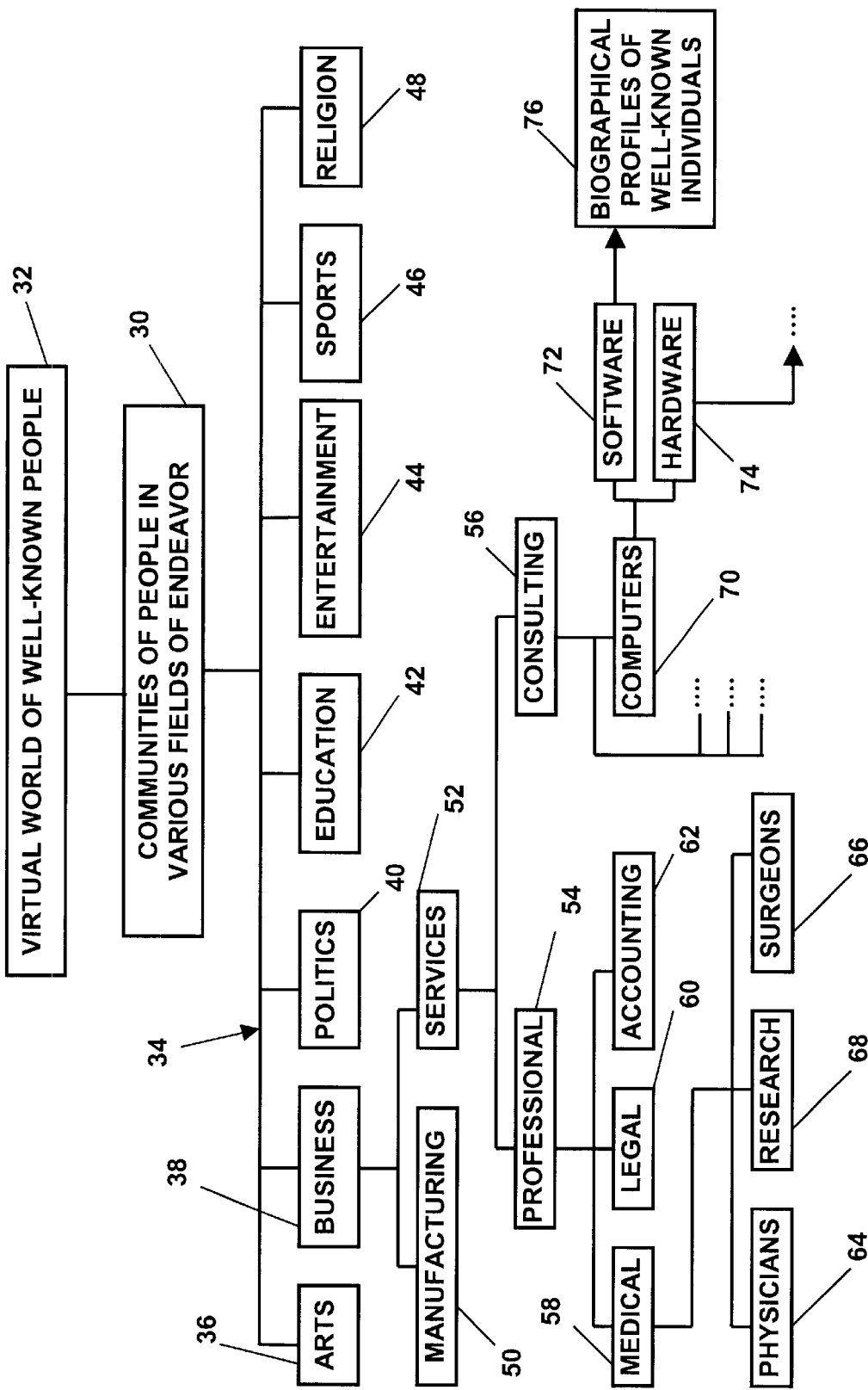
FIG. 3 is a schematic block diagram illustrating arrangement of various virtual communities in different fields of endeavor.

FIG. 3 illustrates a preferable arrangement of various virtual communities 30 in different fields, that together form a virtual world 32 of well-known people. In particular, a major group 34 of virtual communities in fields, such as art 36, business 38, politics 40, education 42, entertainment 44, sports 46 1and religion 48, would be created. The communities in major group 34 would be divided into minor groups, which in turn would further be divided into major sub-groups, minor sub-groups, categories, and sub-categories.

By way of an example, the virtual community of major business group 38 is divided into minor groups of manufacturing 50 and services 52. The minor group of services 52 is further divided into major sub-groups of professionals and consultants 56. The professional sub-group 54 is branched out into minor sub-groups 58, 60 and 62, comprised of medical, legal, and accounting professionals, respectively. The medical sub-group 58 is further divided into categories of physicians 64, surgeons 66, and researchers 68. Likewise, the major sub-group 56 of consultants is divided into minor sub-groups, including computers 70. The minor sub-group 70 of computer persons is further divided into software 72 and hardware 74 categories. The hardware category 74 finally may lead to a community 76 including biographical profiles of well-known people in the software industry, such as Bill Gates. (It is noted herewith that the foregoing is only an illustrative arrangement and various other alternatives thereof may be created, as desired, without departing from the spirit and scope of the invention.)

As can be readily seen, a virtual community of various people in different fields of endeavor created, as noted above, can be extremely useful for those who wish to attain a certain recognizable status in the society. In addition, children wishing to follow the steps of a certain member of the virtual community can easily learn the life experiences of that member and interact with the person to follow his or her goals and objectives in life. This type of virtual community would also be greatly beneficial to the members within the virtual community, as they would be able to interact with each other to educate each other and to learn from the other person's experiences.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims. It is further understood that the present invention is not limited to the claims appended hereto.

What is claimed is:

1. A method of creating an interactive virtual community of people in a field of endeavor, comprising the steps of:
 a) selecting a field of endeavor;
 b) compiling a list of members in the selected field;
 c) selecting a member from the compiled list of members based on a preselected factor;
 d) obtaining biographical information about the selected member;
 e) processing the biographical information in a preselected format to create a personal profile of the selected member;
 f) publishing the profile of the selected member on a machine readable media; and
 g) allowing the selected member to interact with the profile.

2. The method of claim 1, wherein:
 the step (f) comprises publishing the profile of the selected member on a network of computers.

3. The method of claim 2, wherein:
 the step (f) comprises publishing the profile of the selected member on a global computer information network.

4. The method of claim 3, wherein:
 the step (g) comprises allowing the selected member to interact with the profile from a remote location to modify, revise, or update the profile.

5. The method of claim 1, wherein:
 the step (c) comprises selecting a plurality of members from the compiled list of people based on one or more preselected factors.

6. The method of claim 5, wherein:
 the step (e) comprises creating an individual personal profile of each of the selected members.

7. The method of claim 6, further comprising the step of:
 h) creating a virtual community of people by publishing the profiles of the selected members.

8. The method of claim 7, further comprising the step of:
 i) allowing the members of the virtual community to interact with their respective profiles from a remote location.

9. The method of claim 7, further comprising the step of:
i) allowing the members of the virtual community to interact with each other from a remote location.

10. The method of claim 7, further comprising the step of:
i) allowing the members of the virtual community to interact with non-members of the virtual community.

11. The method of claim 8, further comprising the step of:
j) allowing the members of the virtual community to interact with their respective profiles to make modifications, or revisions, or updates thereto.

12. The method of claim 4, wherein:
the step (a) comprises selecting a field of endeavor from the group consisting of arts, accounting, animal rights, business, education, engineering, entertainment, finance, government affairs, human rights, legal, medical, philanthropy, politics, religion, research, science, and sports.

13. The method of claim 12, wherein:
the preselected factor is unique to the selected field of endeavor.

14. The method of claim 13, wherein:
the step (c) comprises selecting a member based on a factor selected from the group consisting of financial net worth, gross revenue, number of years in the field of endeavor, number of awards or prizes received, size of private or governmental grant(s), fame, and number of publications.

15. The method of claim 14, wherein:
the step (d) comprises obtaining biographical information by inquiring the selected member about one or more of the following:
a) Moments
   i) happiest, saddest, toughest, coolest, worst, best, weakest, successful, unsuccessful, embarrassing, and funniest;
b) Goal
   i) past, present, or future;
   ii) personal or professional;
c) Outlook for life
   i) past, present, or future;
   ii) personal or professional;
d) Definition of Success
   i) past, present, or future;
   ii) personal or professional;
e) Dreams
   i) past, present, or future;
   ii) personal or professional;
f) Choices of food, items of personal possession, or places of vacation
   i) past, present, or future;
g) Interests
   i) past, present, or future;
   ii) personal or professional;
h) Social activities
   i) past, present, or future;
   ii) personal or professional;
i) Charitable activities
   i) past, present, or future;
   ii) personal or professional;
j) Outlook for future, society, humanity, politics, government, religion, elderly, children, peers, animals, outer space, ocean, environment, or the selected field of endeavor.

16. A method of creating an interactive virtual community of people with shared interests in a field of endeavor, comprising the steps of:
a) selecting a field of endeavor from the group consisting of accounting, arts, business, politics, education, engineering, entertainment, medical, legal, philanthropy, science, sports, religion, and government affairs;
b) compiling a list of members in the selected field;
c) selecting a plurality of members from the compiled list based on a preselected factor;
d) obtaining biographical information about the selected members;
e) processing the biographical information in a preselected format to create a personal profile of each of the selected members;
f) publishing the profiles of the selected members on a global network of computers to form a virtual community; and
g) allowing the selected members to revise, modify or update their respective profile from a remote location.

17. The method of claim 16, further comprising the step of:
h) allowing the selected members to interact with each other and with non-members of the virtual community.

18. The method of claim 17, wherein:
the preselected factor is unique to the selected field of endeavor and is selected from the group consisting of financial net worth, gross revenue, number of years in the field of endeavor, number of awards or prizes received, size of private or governmental grant(s), fame in the community, and number of publications.

19. A method of creating an interactive profile of a person in a field of endeavor, comprising the steps of:
a) selecting a field of endeavor;
b) compiling a list of members in the selected field;
c) selecting a member from the compiled list based on one or more factors identified by other members in the selected field of endeavor;
d) obtaining biographical information about the selected member;
e) processing the biographical information in a preselected format to create a personal profile of the selected member;
f) publishing the profile of the selected member on a global network of computers; and
g) allowing the selected member to interact with the profile to revise, modify or update the profile from a remote location.

20. A method of creating an interactive profile of a person in a field of endeavor, comprising the steps of:
a) selecting a field of endeavor;
b) compiling a list of members in the selected field;
c) selecting a member from the compiled list based on one or more factors identified by members not in the selected field of endeavor;
d) obtaining biographical information about the selected member;
e) processing the biographical information in a preselected format to create a personal profile of the selected member;
f) publishing the profile of the selected member on a global network of computers; and
g) allowing the selected member to interact with the profile to revise, modify or update the profile from a remote location.

* * * * *